(12) United States Patent
Sanders et al.

(10) Patent No.: US 6,931,022 B1
(45) Date of Patent: Aug. 16, 2005

(54) BACKGROUND TEST SYSTEM FOR TIME DIVISION MULTIPLEXING SWITCHING SYSTEMS

(75) Inventors: Kirk Dow Sanders, San Jose, CA (US); Wing Cheong Chang, Los Altos Hills, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/322,708

(22) Filed: May 28, 1999

(51) Int. Cl.[7] .................. H04B 7/212; H04L 12/50; G01R 31/08
(52) U.S. Cl. .................. 370/442; 370/376; 370/248; 710/117
(58) Field of Search .................. 570/242, 248, 570/250, 352, 364, 376, 378, 442, 449, 458, 570/419, 420, 487, 468, 401, 537; 710/105, 710/72, 117; 714/718

(56) References Cited

U.S. PATENT DOCUMENTS

| | | | | |
|---|---|---|---|---|
| 4,064,369 A | * | 12/1977 | Battocletti | 370/248 |
| 4,149,038 A | * | 4/1979 | Pitroda et al. | 179/15 BF |
| 4,377,859 A | * | 3/1983 | Dunning et al. | 370/376 |
| 4,523,308 A | * | 6/1985 | Bull et al. | 370/360 |
| 5,331,632 A | * | 7/1994 | Aaron et al. | 370/376 |
| 5,351,232 A | * | 9/1994 | Yamashita | 370/248 |
| 6,185,594 B1 | * | 2/2001 | Hilton et al. | 708/270 |
| 6,351,452 B1 | * | 2/2002 | Koenig et al. | 370/217 |

* cited by examiner

*Primary Examiner*—Duc Ho
(74) *Attorney, Agent, or Firm*—Blakely, Sokoloff, Taylor & Zafman LLP

(57) ABSTRACT

A method for testing a transmission system is disclosed. The method comprises receiving a time division multiplexed (TDM) stream on an input of the transmission system. The method also comprises inserting test data in one or more of the plurality unused fields of the TDM stream. Additionally, the method comprises transferring the TDM stream along a plurality of components of the transmission system and comparing the test data against the transferred test data.

28 Claims, 5 Drawing Sheets

BACKGROUND TEST SYSTEM FOR TIME DIVISION MULTIPLEXING SWITCHING SYSTEMS

FIELD OF THE INVENTION

The present invention relates to a test system for a time division multiplexing system. More particularly, the present invention relates to using time slots to transmit test signals in a time division multiplexing switching system, thus testing the connectivity, the digital signal processors, or the packet switching of the time division multiplexing switching system.

BACKGROUND

Developments in router technology have led to system designs that provide a general-purpose connection-oriented transfer mode for a wide range of services. These services include the simultaneous transfer of integrated traffic (data, voice, and video traffic) over the same network system. To efficiently transmit the integrated traffic, prior art systems have relied on a transmission card that processes multiple channels of voice, video, and data using banks of digital signal processors ("DSPs"). Typically, the transmission card comprises a group of framers coupled to a bank of transmission lines. The transmission card also comprises a time slot interchanger ("TSI") coupled between the framers and the banks of DSPs.

The TSI is typically a non-blocking switch that can connect any time slot of an incoming time division multiplexed ("TDM") stream to a different time slot of an outgoing TDM stream. Thus, in the prior art, a bank of transmission lines are multiplexed by the group of framers to generate a TDM stream that is transferred to a first interface of the TSI. Similarly, a bank of DSPs are coupled to a second interface of the TSI. As previously described, the TSI may switch a time slot from the incoming TDM stream to a different time slot of the outgoing TDM stream. Thus, the TSI may transfer data from any one of the transmission lines to any one of the DSPs.

Typically, the DSP that receives the transferred data compresses or otherwise processes the transferred data prior to transmission across a network system. Alternatively, compressed data received by the DSPs may also be uncompressed or otherwise processed and subsequently transferred to one of the transmission lines via the TSI.

FIG. 1 illustrates a prior art transmission system. In particular, system 100 includes a private branch exchange ("PBX") 110 coupled to a network (150) via card 160. PBX 110 is coupled to card 160 via line 115. Typically, line 115 comprises a transmission line that uses a T1 protocol to multiplex twenty-four digitized voice or data channels onto a single line. Thus, PBX 110 may be coupled to twenty-four different devices.

System 100 uses card 160 to transfer data from a device coupled to PBX 110 onto network 150. For example, in system 100, PBX 110 digitizes data from phone 105 or facsimile 106 and multiplexes the digitized signal onto line 115. Subsequently, framer 120 removes the T1 protocol information from the digitized data and generates a TDM stream that is transferred to TSI 130 on line 116. Similarly, the remaining framers of card 160 (Framer 121–12N) transfer TDM streams from other T1 lines (not shown) to TSI 130 on different lines or in a shared fashion—for example along a wired OR line. TSI 130, in turn, generates an outgoing TDM that is transferred to DSP 140, DSP 141, or DSP 142.

Thus, TSI 130 may transfer a time slot of data from line 115 to DSP 140, DSP 141, or DSP 142.

System 100 provides a basic system for connecting PBX devices to a network. Specifically, controller 170 maintains a call connection between the devices coupled to PBX 110 and remote devices coupled to network 150. Typically, controller 170 sets up or tears down the call connections between the devices coupled to PBX 110 and remote devices coupled to network 150 using a switch virtual call protocol or a permanent virtual call protocol. Accordingly, in response to a call set up message, controller 170 instructs TSI 130 to switch time slots from line 115 to a DSP of card 160, thus transferring data between network 150 and a device coupled to PBX 110.

For example, in response to a call set up message, controller 170 may transfer a voice call from phone 105 to a remote device coupled to network 150. Alternatively, controller 170 may transfer data from facsimile 106 to a remote device coupled to network 150, thus resulting in a flexible call connection system. Although system 100 provides a flexible call connection system, the complex interconnectivity of system 100 results in numerous disadvantages during the transmission of voice calls. In particular, voice calls require a reliable system to ensure a high quality of service between different customers. One disadvantage results from an interconnectivity error reducing the voice transmission reliability of system 100. Another disadvantage results from a DSP error reducing the voice transmission reliability of system 100.

SUMMARY OF THE INVENTION

It is therefore an object of the invention to provide a testing system that tests the interconnectivity of a transmission system.

It is a further object of the invention to provide a testing system that tests the digital signal processors of a transmission system.

It is a further object of the invention to provide a testing system that tests the connection time slots of a time slot interchanger used in a transmission system.

It is a further object of the invention to provide a non-destructive testing system that tests a transmission system without affecting active connections.

These and other objects of the invention are provided by a method for testing a transmission system and an apparatus comprising a transmission system. The method comprises receiving a time division multiplexed (TDM) stream on an input of the transmission system. For one embodiment, the TDM stream comprises a plurality of data fields and a plurality of unused fields. The method also comprises inserting test data in one or more of the plurality of unused fields of the TDM stream. Additionally, the method comprises transferring the TDM stream along a plurality of components of the transmission system and comparing the test data against the transferred test data.

The transmission system comprises a controller. For one embodiment, the controller is operable to set up call connections between interfaces of the transmission system. The transmission system also comprises a framer block coupled to the controller. For one embodiment, the framer block is operable to generate time division multiplexed (TDM) streams having a plurality of data fields and a plurality of unused fields. Additionally, the transmission system comprises a field programmable gate array (FPGA) coupled to the controller and the framer block. For one embodiment, the FPGA is operable to insert test data in one or more of the plurality of unused fields. Furthermore, the transmission system comprises a plurality of time slot interchangers ("TSIs") coupled to the controller and the FPGA. For another embodiment, the TSIs are operable to switch the fields of the TDM stream.

Other objects, features, and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

Figure 1:
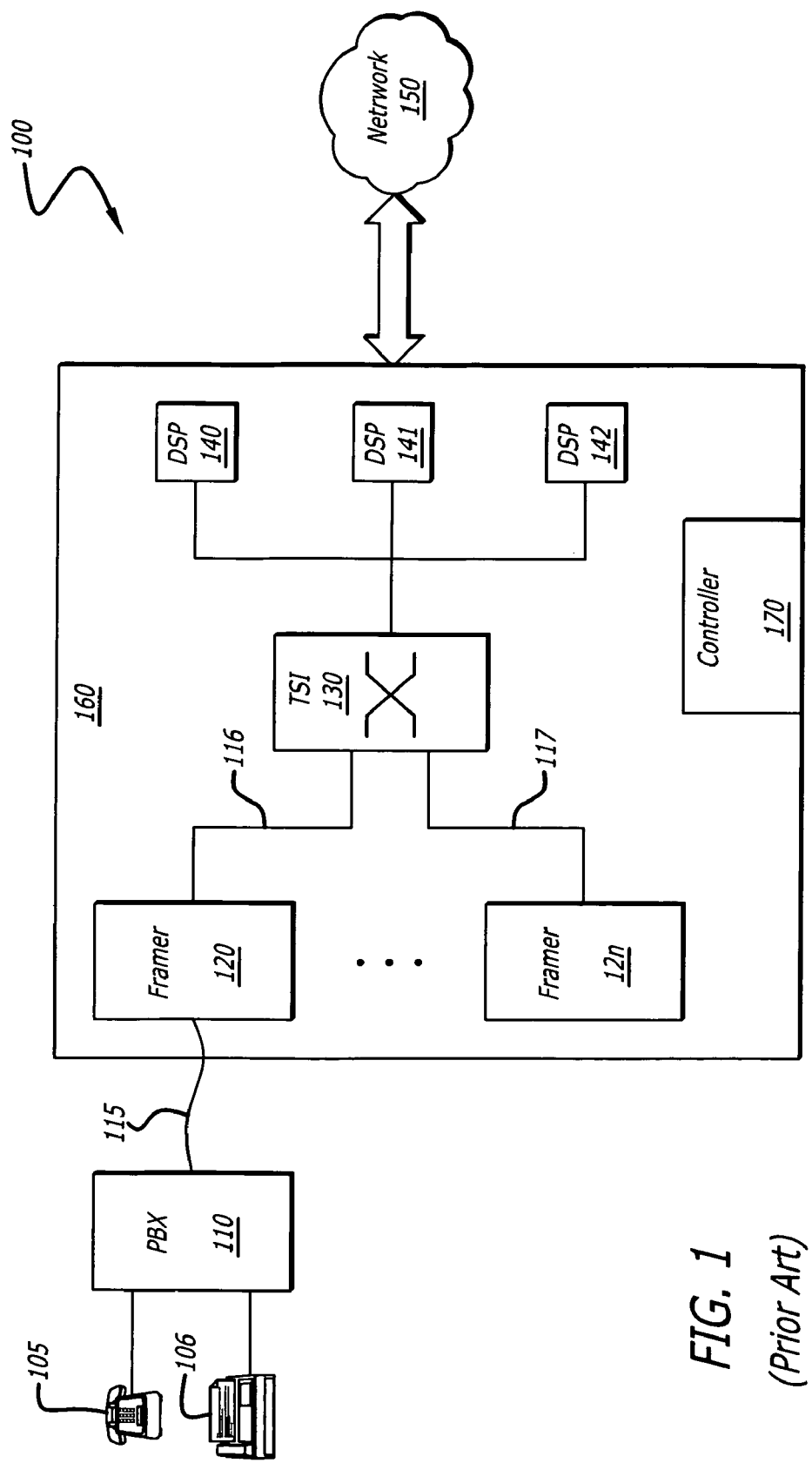
FIG. 1 shows a prior art transmission system.

A method for testing a transmission system is disclosed. For one embodiment, the transmission system comprises a time division multiplexing system that switches data between an incoming time division multiplexed ("TDM") stream and outgoing TDM stream. The data switching allows for the transfer of data between a bank of digital signal processors ("DSPs") and the interfaces of the transmission system. For one embodiment, a first interface of the transmission system is coupled to a cell-based multi-service network comprising Frame Relay, Asynchronous Transfer Mode ("ATM"), High-level Data Link Control ("HDLC"), Internet Protocol ("IP"), or Time Division Multiplexed ("TDM") networks. For another embodiment, the second interface of the transmission system is coupled to a plurality of transmission lines that follow a T1 transmission protocol, thus the transmission lines comprise a transmission speed of 1.544 Mbits per second with twenty-four voice channels multiplexed onto a single twisted-pair. For yet another embodiment, the transmission lines follow an E1 transmission protocol with thirty-two voice channels multiplexed onto a single twisted-pair.

For one embodiment, test data is inserted in a time slot of a TDM stream via a field programmable array ("FPGA"). For alternative embodiments, test data may be inserted in a time slot of a TDM stream via logic circuits including application specific integrated circuits. The time slot is transferred throughout the transmission system via a time slot interchanger ("TSI") of the transmission system. Subsequently, the transferred test data is compared against a copy of the test data and the connectivity of the transmission system is determined.

For another embodiment, the test data is inserted in an unused time slot of the transmission system's TDM stream. In particular, during normal operation, the unused time slots may be set to a value of all "0s" or all "1s" To test the components of the transmission system, however, the unused time slots may be replaced with test data. The insertion of the test data in an unused time slot ensures that the testing of the transmission system does not reduce the operational capability of the transmission system.

For yet another embodiment, the test comprises the testing of a DSP in the transmission system. In particular, a test signal is generated by a DSP of the transmission system. The signal is transmitted by the DSP to a TSI of the transmission system in an unused time slot. The TSI, in turn, re-transmits the signal back to the DSP in a subsequent unused time slot. Thus, if the DSP receives a duplicate of the transmitted signal, the DSP and the TSIs are deemed to be operational.

Thus, an intended advantage of an embodiment of the invention is to provide a testing algorithm that determines the connectivity of a transmission system without interrupting the operation of the transmission system.

Another intended advantage of an embodiment of the invention is to provide a testing system that determines the operation of the DSPs of a transmission system without interrupting the operation of the transmission system.

Yet another intended advantage of an embodiment of the invention is to provide a test system that tests the connection time slots of a time slot interchanger used in a transmission system.

Figure 2:
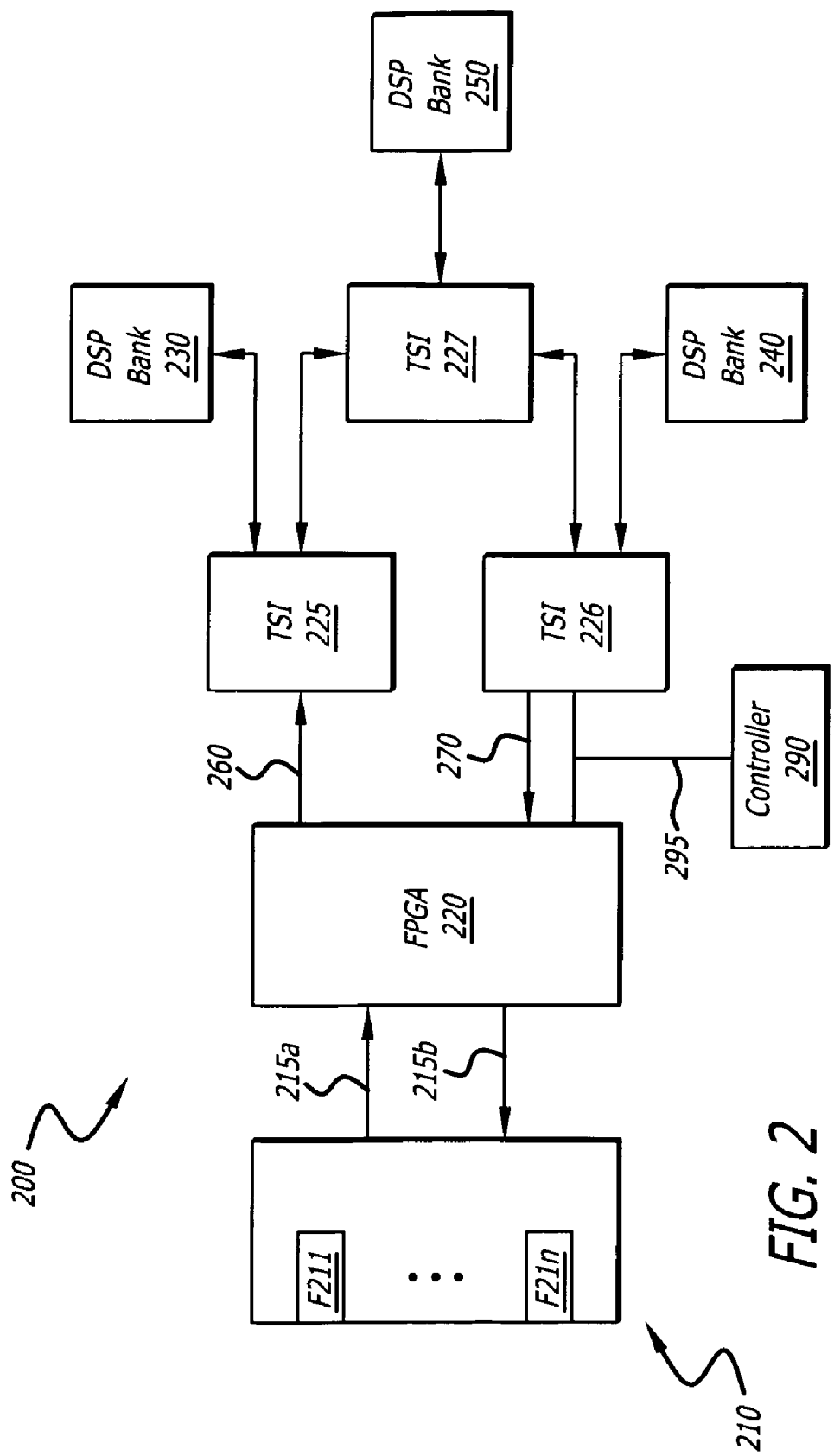
FIG. 2 illustrates one embodiment of a transmission system using a field programmable gate area.

FIG. 2 illustrates one embodiment of a transmission system using a field programmable gate array ("FPGA"). In particular, system 200 comprises a transmission system that interchanges the time slot allocation of data received or transmitted by the interfaces of system 200—i.e. a time division multiplexing system. As Illustrated in FIG. 2, system 200 comprises a plurality of framers F211–F21N (block 210) coupled to a FPGA (220) via lines 215*a* and 215*b*. FPGA 220, in turn, is coupled to a plurality of digital signal processors (DSP bank 230–250) via time slot interchangers (TSIs 225–227). For one embodiment, both DSP bank 230 and DSP bank 240 comprise six DSPs. For another embodiment, DSP bank 250 comprises 24 DSPs. For yet another embodiment, each TSI comprises a non-blocking switch that switches data between sixteen inputs and sixteen outputs, alternatively sixteen input/outputs ("I/Os"). Additionally, each TSI may operate in a minimum delay mode or a constant delay mode. In the minimum delay mode the TSIs transfer data in the same frame the data is received. In the constant delay mode, however, the TSIs transfer data in a subsequent frame from which the data is received.

For one embodiment, block 210 includes eight framers coupled to line 215*a* and line 215*b*. For another embodiment, each of the framers of block 210 is coupled to a T1 line (not shown). Accordingly, block 210 combines the incoming TDM stream from eight T1 lines into a single DSP TDM stream on line 215*a*. Subsequently, a slot from the DSP TDM stream is routed to one of the DSPs in DSP bank 230–250 via FPGA 220 and TSIs 225–227. Alternatively, block 210 may receive a framer TDM stream from FPGA 220 via line 215*b*. The framer TDM stream comprises the data transferred from the DSPs of DSP bank 230–250 to FPGA 220.

The operational speed of system 200 allows the transfer of data between block 210 and FPGA 220 without any delays. For example, for one embodiment, each framer of block 210 is coupled to a T1 line that transfers 24 time slots of data per frame. Accordingly, both line 215*a* and line 215*b* operate on an eight kilo-hertz clock cycle with 128 slots per frame. Thus, in a period of 0.125 milliseconds, line 215*a* and line 215*b* may transfer 256 time slots of data between block 210 and FPGA 220. In the present example, however, each T1 line transfers 24 time slots of data in a frame. Thus, FPGA 220 may transfer 192 time slots of data and 64 unused time slots per frame. For alternative embodiment, system 200 may operate at a much higher frequency, thus resulting in an increased number of unused time slots available for a given frame. For another embodiment, each time slot transfers eight bits of data.

As illustrated in FIG. 2, system 200 also includes controller 290 coupled to both FPGA 220 and the time slot inter-changers (TSIs 225–227) via control bus 295. For one embodiment, controller 290 maintains a call connection between the interfaces of system 200. Specifically, controller 290 uses the time slot inter-changers (TSIs 225–227) to set up a connection path between the DSP TDM stream on line 260 and a subset of the DSPs in DSP bank 230–250. Alternatively, controller 290 uses the time slot inter-changers (TSIs 225–227) to set up a connection path between the DSPs in DSP banks and the framer TDM stream on line 270. Thus, by setting the switch points of the time slot inter-changers (TSIs 225–227) controller 290 may transfer data between T1 lines (not shown) coupled to block 210 and a network (not shown) coupled to DSP bank 230–250.

To facilitate the call connection between the interfaces of system 200, controller 290 also determines which time slots are used to connect a call. For one embodiment, controller 290 maintains a host table (not shown) to determine available time slots. Controller 290 updates the host table to reflect the set up and removal of call connections between the interfaces of system 200. For example, for one embodiment the host table (not shown) comprises the time slots currently used to transfer data between the framers of block 210 and the DSPs of DSP bank 230–250. The host table also comprises which time slots are currently used to transfer data between the DSPs of DSP bank 230–250 and a network (not shown) coupled to DSP bank 230–250. Accordingly, for one embodiment, controller 290 determines the location of the unused time slots on both the DSP TDM stream (line 260) and the framer TDM stream (line 270) based on the call connections indicated in the host table.

As previously described, controller 290 uses the host table to determine the number of available unused time slots. In particular, controller 290 uses the host table and the operational characteristics of DSP bank 230–250 and TSIs 225–227 to determine the number of available unused time slots in system 200. For example, for one embodiment, DSP bank 230–250 includes thirty-six DSPs. Each of the DSPs may transmit data on one of sixty-four time slots. In the present example, however, controller 290 only uses the first sixteen time slots of a given DSP to set up a call connection. Additionally, in the present example, for each frame a TSI may transfer 128 time slots of data between a given input and a given output. Thus, if the time slots of all the framers (F211–F21n) and DSPs are used to set up call connections, system 200 comprises the following unused time slots:

(128 time slots)(16 TSI I/O transfers)–(8 framers)(24 time slots)–(36 DSPs) (16 time slots used for call connection)=1280 time slots For another example, each of the framers (F211–F21N) transfer both voice and control signals. Thus, the framers may transfer 384 time slots—(2) (8 framers)(24 time slots). Accordingly, if the timeslots of all the framers (F211–F21n) and DSPs time slots are used to set up call connections, system 200 comprises 1088 unused time slots.

Figure 3:
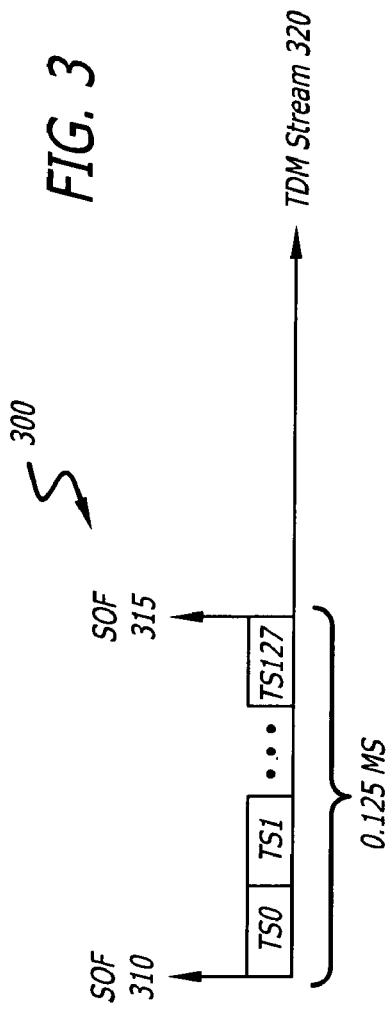
FIG. 3 illustrates one embodiment of a frame in a time division multiplexed stream.

FIG. 3 illustrates one embodiment of a frame in a time division multiplexed stream. In particular, frame 300 comprises 128 time slots (TS0–TS127) of data located in a 0.125 ms time slice of TDM stream 320. The boundaries of the 0.125 ms time slice are delineated by lines start of frame ("SOF") 310 and SOF 315—SOF 315 indicating the beginning of the next frame.

For one embodiment, frame 300 corresponds to a single frame of the DSP TDM stream transmitted on line 215a. Additionally, time slot TS0 corresponds to a segment of data received from framer F211. Accordingly, to transmit data from F211 to DSP 4 (not shown) of DSP bank 250, controller 290 configures the switching of TSI 225 and TSI 227. Specifically, controller 290 configures TSI 225 so that the first time slot of frame 300 is switched to an Nth time slot (N represents one of the 128 possible time slots switched on a give I/O of TSI 225) Additionally, controller 290 configures TSI 227 so that the Nth time slot of frame 300 is switched to the receiving time slot of DSP 4. Thus, the configuration of TSI 225 and TSI 227 results in the data from F211 being transferred to DSP 4 of DSP bank 250.

For another embodiment, frame 300 corresponds to a single frame of the framer TDM DSP stream transmitted on line 215b. Additionally, time slot TS1 corresponds to the receiving time slot of framer F217. Accordingly, to transmit data from DSP 2 (not shown) of DSP bank 250 to framer F217, controller 290 configures the switching of TSI 226 and TSI 227. In particular, controller 290 configures TSI 227 so that the transmitting time slot of DSP 2 is switched to a Yth time slot. Additionally, controller 290 configures TSI 226 so that the Yth time slot of frame 300 is switched to the second time slot. Thus, the configuration of TSI 225 and TSI 227 results in the data from DSP 2 of DSP bank 250 being transferred to framer F217.

As previously described, increasing the operational frequency of system 200 increases the number of unused time slot available in the DSP TDM stream and the framer TDM stream. For one embodiment, the unused time slots may be used to transmit test data without interrupting the call connection operation of system 200. For an alternative embodiment, the test data transmitted in the unused time slots is generated by an FPGA. Accordingly, during normal operation the FPGA passes data transparently between a framer and a TSI. During testing, however, the FPGA may generate or receive data on the unused time slots of a frame. Thus, the FPGA may be used to test the connectivity of system 200, a TSI connection set up, the operation of the DSPs, or the operation of a framer.

Figure 4:
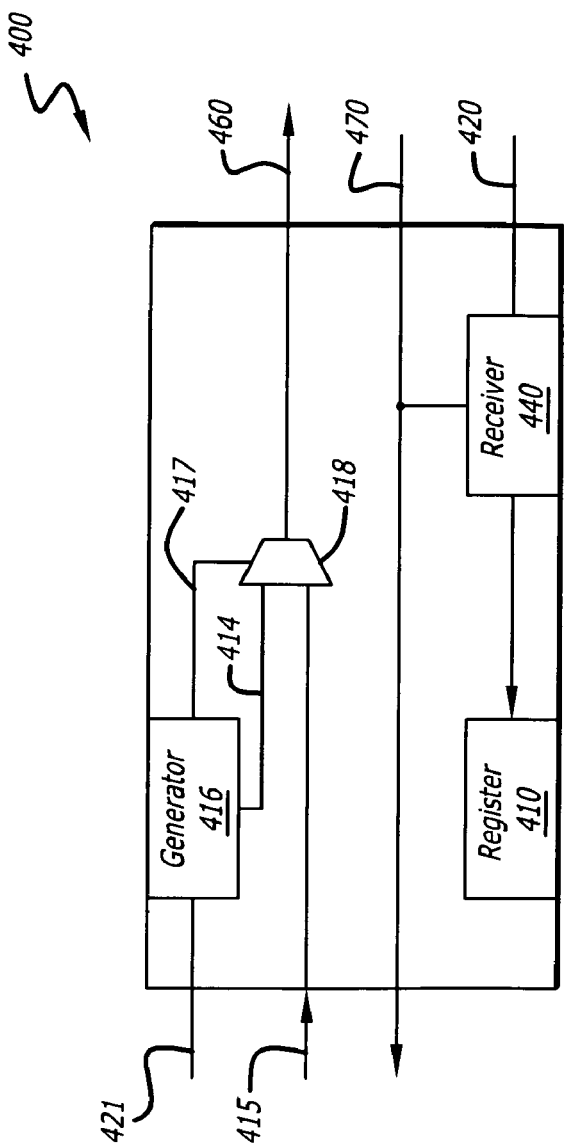
FIG. 4 illustrates one embodiment of a field programmable gate array.

FIG. 4 illustrates one embodiment of a FPGA. In particular, FPGA 400 comprises receiver 440 coupled to line 470, control 420, and register 410. FPGA 400 also comprises control 421 coupled to generator 416. Generator 416, in turn, is coupled to a first input of multiplexor (mux 418) via line 414. Generator 416 is also coupled to the select input of mux 418 via select 417. Using select 417, generator 416 selectively couples the output of mux 418 to line 415 or line 414. Specifically, to transmit test data on line 460, control 421 sets select 417 to a logical high value and line 414 is selectively coupled to line 460. Alternatively, to transfer TDM data from line 415 to line 460, control 421 sets select 417 to a logical low value and line 415 is selectively coupled to line 460.

For one embodiment FPGA 400 corresponds to FPGA 220. Accordingly, line 415 corresponds to line 215a and line 460 corresponds to line 260. Additionally, line 470 corresponds to both line 215b and line 270 because FPGA 400 transfers the data from line 270 to line 215b. Furthermore, control 420 and control 421 corresponds to two lines of control bus 295.

The use of FPGA 400 in system 200 allows for the generation of test data during the operation of system 200. For example, for one embodiment, for a given unused time slot controller 290 sets up a connection path that passes from line 260 through all the DSPs of DSP bank 230–250 back to line 270. In particular, controller 290 creates a connection path that travels from the time slot inter-changers (TSIs 225–227) to a first DSP and back to the time slot inter-changers. Subsequently, the connection path is continued from the time slot inter-changers (TSIs 225–227) to a second DSP and back to the time slot inter-changers. The connection path is continued until all the DSPs are connected. For an alternative embodiment, a connection path is set up that tests a subset of the DSPs in DSP bank 230–250. For another embodiment, a connection path between block 210 and FPGA 220 is set up, thus testing the connectivity between the framers (211–21N) and FPGA 220.

After the connection path is set up, for one embodiment, controller 290 inputs an eight bit test data sequence into a register of generator 416 via control 421. For another embodiment, the test data sequence is a predetermined eight bit value stored in the register of generator 416. Subsequently, during the unused time slots of a given frame, controller 290 selectively transfers the test data sequence to line 460. Thus, the test data is transmitted via the connection path established by controller 290.

As previously described, FPGA 400 allows system 200 to either transparently transfer a TDM stream or transmit test data in an unused time slot of the TDM stream. After the test data is routed across a connection path, the test data is latched by receiver 440. For one embodiment, controller 290 transmits a latch signal to receiver 440 via control 420. In response to the latch signal, receiver 440 latches data from an unused time slot transmitted on line 470. Subsequently, receiver 440 compares the latched data to the transmitted test data. For one embodiment, receiver 440 uses a logic comparator to compare the latched data to the transmitted test data. For another embodiment, receiver 440 uses exclusive-or gates to compare the latched data to the transmitted test data.

For yet another embodiment, receiver 440 includes a counter (not shown) coupled to select 417. The counter is operable to decrement a count value inserted in the counter by controller 290. Thus, the transmission of the test data, which is initiated by a transition of select 417, results in the counter counting down to a zero value. Accordingly, if the counter reaches a value of zero, the unused time slot data on line 470 is latched by receiver 440.

For one embodiment, FPGA 400 stores the result of the comparison operation in register 410. For example, for one embodiment, if the transmitted test data and the data latched by receiver 440 are the same, register 410 includes a zero value. Thus, to determine the connectivity of test system 200, controller 290 polls register 410 to check the data stored in register 410. Accordingly, for one embodiment, if the data stored in register 410 equals a zero value, the elements used in the controller 290 connection path are functioning normally. On the other hand, if the data stored in register 410 does not equal a zero value, controller 290 raises an error flag, thus indicating that the elements of the connection path are operating incorrectly.

For example, for one embodiment, for a given unused time slot controller 290 sets up a connection path that passes from line 260 (460) through a subset of the DSPs of DSP bank 230–250 back to line 270 (420). Subsequently, generator 416 transmits the test data in the unused time slot. For one embodiment, controller 290 polls register 410 a predetermined time period after the test data transmission. For another embodiment, controller 290 polls register 410 based on a time period that corresponds to the number of DSPs through which the test data is transferred.

For one embodiment, system 200 comprises a card used in an ATM switch. Accordingly, the controller 290 error flag is used to notify a systems manager that the card should be replaced. Alternatively, the controller 290 error flag may be used to notify a systems manager or an active software of the ATM switch that a specific component of the card should be disabled. For alternative embodiment, system 200 comprises a transmission card used in voice or data transmission systems.

For illustrative purposes, FIG. 4 illustrates single lines (460 and 470) coupled to FPGA 400, however, it is contemplated for alternative embodiments that multiple TDM transfer lines are routed via FPGA 400. Test data may be inserted into each of the TDM lines by varying the size of mux 418. For example, for one embodiment, line 460 comprises two TDM streams. Accordingly, each TDM stream is coupled to a multiplexor, thus allowing generator 416 to insert test data in any one of the TDM streams. In another example, line 470 comprises two TDM streams. Accordingly, for one embodiment, each TDM stream is coupled to a different latch and register, thus allowing controller 290 to poll each register independently to determine the connectivity of the connection path using any one of the TDM streams. For another embodiment, both TDM streams are coupled to a single latch in receiver 440, however, the comparison results between the latched data and the test data are input in different register—each register corresponding to a single TDM stream.

Figure 5:
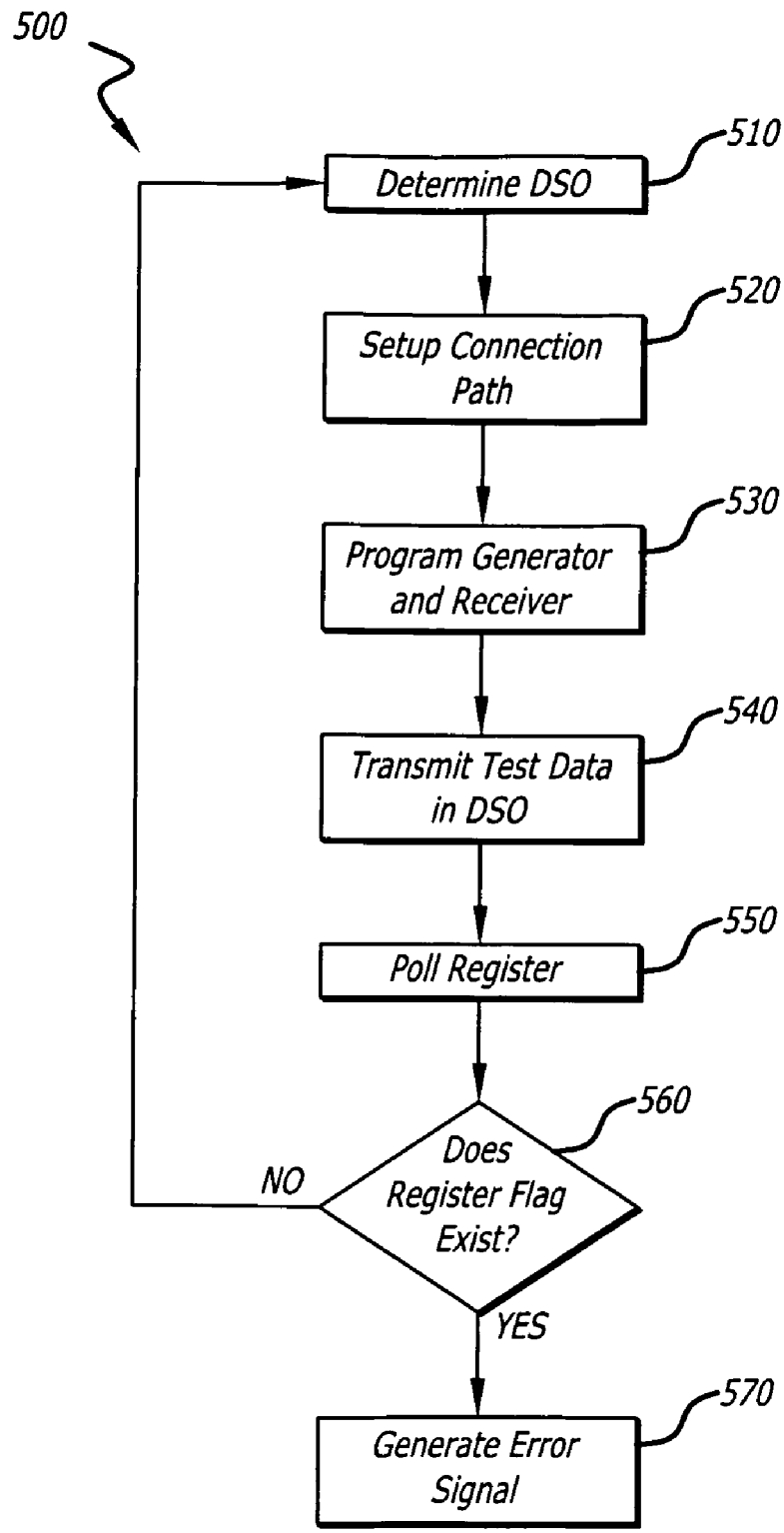
FIG. 5 shows one embodiment of a flow chart illustrating the testing of a transmission system.

FIG. 5 shows one embodiment of a flowchart illustrating the testing of a transmission system. In particular, flowchart 500 comprises blocks 510 through 570. For one embodiment, the blocks show the steps used by system 200 to test the connectivity or operation of the elements in system 200. As illustrated in FIG. 5, operation begins in block 510. At block 510, control 290 identifies the unused time slots available in the DSP TDM stream (line 260) and the framer TDM stream (line 270).

For one embodiment, controller 290 identifies the unused time slots using a host table. In particular, the host table includes a list of time slots that is updated as call connections are set up and removed between the interfaces of system 200. Thus, controller 290 uses the host table list of time slots to identify the unused time slots of system 200. After the unused time slots are identified block 520 is processed.

At block 520, controller 290 sets up a connection path using the unused time slots identified in block 510. In particular, controller 290 programs the switching characteristics of TSIs 225–227 to transfer test data throughout system 200 using the unused time slots identified in block 510. Controller 290 also programs the DSPs of DSP bank 230–250 to receive and transmit test data during unused time slots. For one embodiment, controller 290 sets up a connection path to test the connectivity of the elements in system 200. For another embodiment, controller 290 sets up a connection path to test the operation of the elements in system 200. Subsequently, block 530 is processed.

At block 530, controller 290 stores test data in a generator and receiver of FPGA 220. For alternative embodiments, FPGA 200 transfers multiple TDM streams, accordingly, for each TDM stream controller 290 stores the test data in a separate generator corresponding to the TDM stream. Subsequently, block 540 is processed.

At block 540, the test data stored in a generator of the FPGA is transmitted during an unused time slot identified in block 510. For one embodiment, to transmit the test data, controller 290 transmits a select signal to FPGA 220 via control bus 295. For another embodiment, FPGA 220 corresponds to FPGA 400 of FIG. 4. Accordingly, the transition of the select signal on control bus 295 results in the output of FPGA 400 switching from line 415 to line 414. For yet another embodiment, the control 290 select signal transmission for the duration of a single time slot, thus transferring the test data for a single time slot. After the test data is transmitted, block 550 is processed.

At block 550, controller 290 polls the register in FPGA 220. For one embodiment, controller 290 polls the register a predetermined time period after the transmission of the test data, thus allowing the transfer of the test data throughout system 200. For another embodiment, the predetermined time period corresponds to the number of TSIs and DSPs through which the test data is transferred. After controller 290 polls the FPGA 220 register, decision block 560 is processed.

At decision block 560, controller 290 examines the polled register value to determine whether the test data was correctly transferred throughout system 200. For one embodiment, if the register includes a zero value, the test data was correctly transferred through system 200 and block 510 is re-processed. If the register does not include a zero value, however, block 570 is processed.

At block 570, controller 290 generates an error flag indicating a fault in the connectivity or operation of the elements in system 200. For one embodiment, system 200 comprises a card used in an ATM switch. Accordingly, the error flag in block 570 is used to notify a systems manager that the card should be replaced. Alternatively, the error flag may be used to notify a systems manager or an active software of the ATM switch that a specific component of the card should be disabled.

Figure 6:
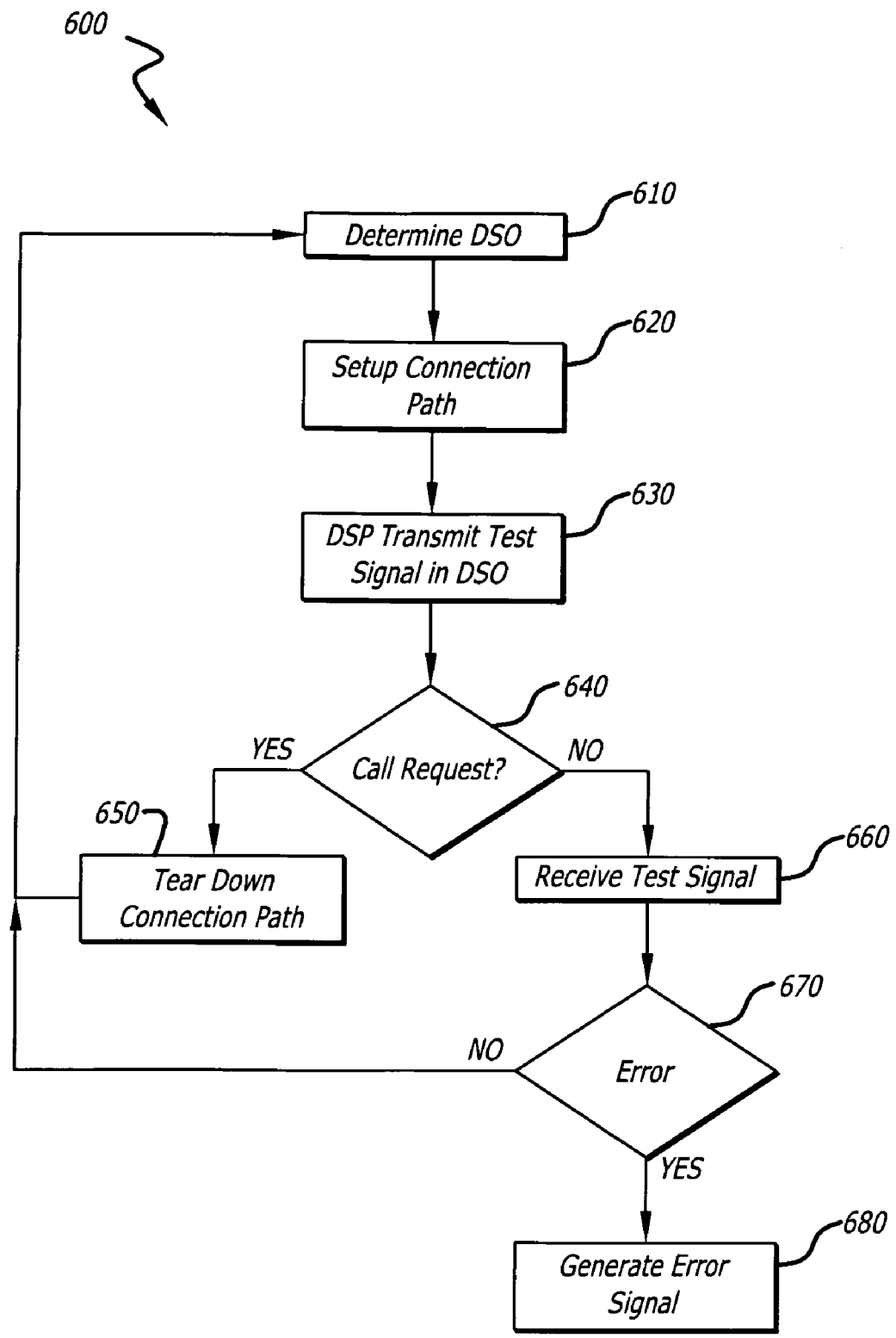
FIG. 6 shows one embodiment of a flow chart illustrating the testing of a digital signal processor.

FIG. 6 shows one embodiment of a flow chart illustrating the testing of a digital signal processor—hereinafter the "tested DSP." In particular, flowchart 600 comprises blocks 610 through 680. For one embodiment, the blocks show the steps used by system 200 to test the connectivity or operation of a DSP in DSP bank 230–250. For alternative embodiments, multiple DSPs of DSP bank 230–250 are programmed to receive and transmit test data during unused time slots, thus resulting in the testing of multiple DSPs.

As illustrated in FIG. 6, operation begins in block 610. At block 610, control 290 identifies the unused time slots available in the DSP TDM stream (line 260) and the framer TDM stream (line 270). For one embodiment, controller 290 identifies the unused time slots using a host table. In particular, the host table includes a list of time slots that is updated as call connections are set up and removed between the interfaces of system 200. Thus, controller 290 uses the host table list of time slots to identify the unused time slot of system 200. After the unused time slots are identified block 620 is processed.

At block 620, controller 290 sets up a connection path using the unused time slots identified in block 610. In particular, controller 290 programs the switching characteristics of TSIs 225–227 to transfer test data throughout system 200 using the unused time slots identified in block 610. For one embodiment, controller 290 sets up a connection path to test the operation of the tested DSP, thus the connection path comprises of a loop between the tested DSP and a subset of the TSIs. Subsequently, block 630 is processed.

At block 630, controller 290 programs the tested DSP to receive and transmit a test signal data during the unused time slots identified in block 610. For one embodiment, the tested DSP transmits and receives the test signal in a single frame. For another embodiment, the tested DSP transmits the test signal in a first frame and receives the test signal in a following frame. For alternative embodiments, the test signal may comprise a tone or dual tone multi-frequency ("DTMF") digit relay syntax. Subsequently, decision block 640 is processed.

At decision block 640, controller 290 determines whether the tested DSP is required for a call connection set up. Specifically, controller 290 determines whether new call set up requires the unused time slots used by the tested DSP to perform a call connection between the interface of system 200. If a call connection requires the unused time slots used by the tested DSP, block 650 is processed. At block 650, controller 290 removes the connection path set up in block 620—i.e. controller 290 tears down the connection path set up in block 620 to facilitate the incoming call set up request. Subsequently, block 610 is processed. If the call connection does not require the unused time slots used by the tested DSP, however, block 660 is processed.

At block 660, the tested DSP receives the signal transmitted in block 630. Subsequently, decision block 670 is processed. At decision block 670, the tested DSP compares the received signal to the test signal transmitted in block 630. For one embodiment, if the signal received in block 660 corresponds to the signal transmitted in block 630 there are no connectivity or operational errors associated with the tested DSP and block 610 is re-processed. If the signal received in block 660 does not corresponds to the signal transmitted in block 630, block 680 is processed.

At block 680, controller 290 generates an error flag indicating a fault in the connectivity or operation of the tested DSP. For one embodiment, controller 290 generates the error flag in response to an error signal from the tested DSP. For another embodiment, controller 290 generates the error flag in response to an error flag included in the tested DSP. For yet another embodiment, the tested DSP is included in a transmission card. Accordingly, the error flag in block 680 is used to notify a systems manager that the card should be replaced. Alternatively, the error flag may be used to notify a systems manager that a specific component of the card should be disabled.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A transmission system comprising:
   a framer block operable to generate a time division multiplexed (TDM) stream having a plurality of data fields and a plurality of unused fields;
   a logic circuit coupled to the framer block, wherein the logic circuit is operable to insert test data in one or more of the plurality or unused fields and to compare received data to the test data; and
   a controller coupled to the framer block, the logic circuit, and a plurality of components of the transmission system, wherein the controller is operable to set up a connection path from the logic circuit, along the plurality of components of the transmission system, and back to the logic circuit.

2. The transmission system of claim 1, wherein the time slot interchangers are further operable to transfer the test data along components of the transmission system using one or more of the plurality of unused fields.

3. The transmission system of claim 2, wherein the logic circuit comprises a receiver, the receiver operable to store the transferred test data.

4. The transmission system of claim 3, wherein the logic circuit further comprises a comparator, the comparator configured to compare the inserted test data and the transferred test data.

5. The transmission system of claim 4, wherein the logic circuit is further operable to generate an error flag if the inserted test data is different from, the transferred test data.

6. The transmission system of claim 5, wherein the logic circuit comprises a field programmable gate array.

7. A transmission system comprising:
   receiver means for receiving a time division multiplexed (TDM) stream on an input of the transmission system, wherein the TDM stream comprises a plurality of data fields and a plurality of unused fields;
   logic means coupled to the receiver means, the logic means for inserting test data in, one or more of the plurality unused fields of the TDM stream and for comparing received data to the test data;
   controller means coupled to the receiver means, the logic means, and a plurality of components of the transmission system, the controller means for setting up a connection path from the logic means, along the plurality of components of tie transmission system, and back to the logic circuit.

8. The transmission systems or claim 7, wherein the TSI means is further for generating a connection path between the plurality of components or the transmission system.

9. The transmission system of claim 8, wherein the connection path is configured to transfer the test data between the plurality of components of the transmission system using one or more of the plurality unused fields of the TDM stream.

10. The transmission system of claim 9, wherein the receiver means is further for storing the transferred test data prior to comparing the test data against the transferred test data.

11. The transmission system of claim 9, further comprising error generator means coupled to the receiver means and the logic means, the error generator means for generating an error flag if the test data is different from the transferred test data.

12. A transmission system comprising:
   receiver means for receiving a time division multiplexed (TDM) stream on an input of the transmission system, wherein the TDM stream comprises a plurality of data fields and a plurality of unused fields;
   digital signal processor (DSP) means for generating a test signal;
   logic means coupled to the receiver means and the DSP means, the logic means for inserting the test signal in one or more of the plurality unused fields of the TDM stream;
   time slot interchanger (TSI) means coupled to the logic means, the TSI means for referring the TDM stream along a plurality of components of the transmission system; and
   comparator means coupled to the receiver means, the comparator means for comparing the test signal against the transferred test signal.

13. The transmission system of claim 12, wherein the TSI means is further for generating a connection path, between the plurality of components of the transmission system.

14. The transmission system of claim 13, wherein the connection path is configured to transfer the test data between the plurality of components of the transmission system using one or more of the plurality unused fields of the TDM stream.

15. The transmission system of claim 13, further comprising error generator means coupled to the receiver means and the logic means, the error generator means for generating all error flag if the test signal is different from the transferred test signal.

16. A program, embodied in data signals on a computer readable medium, for testing a transmission system, said program comprising:
   a receiver segment for receiving a time division multiplexed (TDM) stream on an input of the transmission system, wherein the TDM stream comprises a plurality of data fields and a plurality of unused fields;
   a logic segment coupled to the receiver segment, the logic segment for inserting test data in one or more of the plurality unused fields of the TDM stream and for comparing received data to the test data;
   a controller segment coupled to the receiver segment and the logic segment, the controller segment for transferring the TDM stream from the logic segment, along a plurality of components of the transmission system, and back to the logic segment.

17. The transmission system of claim 16, wherein the TSI means is further to generate a connection path between the plurality of components of the transmission system.

18. The transmission system of claim 17, wherein the connection path is configured to transfer the test data between the plurality of components of the transmission system using one or more of the plurality unused fields of the TDM stream.

19. The transmission system of claim 18, wherein the receiver segment is further for storing the transferred test data prior to comparing the test data against the transferred test data.

20. The transmission system of claim 18, further comprising an error generator segment coupled to the receiver segment and the logic segment, the error generator segment for generating an error flag if the test data is different from the transferred test data.

21. A program, embodied in data signals on a computer readable medium, for testing a digital signal processor (DSP) of a transmission system, said program comprising:
   a receiver segment for receiving a time division multiplexed (TDM) stream on an input of the transmission system, wherein the TDM stream comprises a plurality of data fields and a plurality of unused fields;
   digital signal processor (DSP) means for generating a test signal;
   a logic segment coupled to the receiver segment and the, DSP means, the logic segment for inserting the test signal in one or more of the plurality unused fields of the TDM stream;
   a time slot interchanger (TSI) segment coupled to the logic segment, the TSI segment for transferring the TDM stream along a plurality of components of the transmission system; and
   a comparator segment coupled to the receiver segment, the comparator segment for comparing the test signal against the transferred test signal.

22. The transmission system of claim 21, wherein the TSI segment is further for generating a connection path between the plurality of components of the transmission system.

23. The transmission system of claim 22, wherein the connection path is configured to transfer the test data between the plurality of components of the transmission system using one or more of the plurality unused fields of the TDM stream.

24. The transmission system of claim 22, further comprising an error generator segment coupled to the receiver segment and the logic segment, the error generator segment for generating an error flag if the test signal is different from the transferred test signal.

25. A transmission system comprising;
- a receiver, wherein the receiver is operable to receive a time division, multiplexed (TDM) stream on an input of the transmission system, wherein the TDM stream comprises a plurality of data fields and a, plurality of unused fields;
- a digital signal processor (DSP) operable to generate a test signal;
- a logic circuit coupled to the receiver and the DSP, wherein the logic circuit is operable to insert the test signal in one or more of the plurality unused fields of the TDM stream;
- a plurality of time slot interchangers (TSIs) coupled to the controller and the logic circuit, wherein the TSIs are operable to transfer the TDM stream along a plurality of components of the transmission system; and
- a comparator coupled to the receiver and the logic circuit, the comparator operable to compare the test signal against the transferred test signal.

26. The transmission system of claim 25, wherein the TSIs are further operable to transfer the test signal along components of the transmission system using one or more of the plurality of unused fields.

27. The transmission system of claim 26, wherein the receiver is further operable to store the test signal.

28. The transmission system of claim 27, further comprising a comparator coupled to the receiver and the logic circuit, the comparator operable to compare the test signal against the transferred test signal.

* * * * *

UNITED STATES PATENT AND TRADEMARK OFFICE
CERTIFICATE OF CORRECTION

| | | |
|---|---|---|
| PATENT NO. | : 6,931,022 B1 | Page 1 of 2 |
| APPLICATION NO. | : 09/322708 | |
| DATED | : August 16, 2005 | |
| INVENTOR(S) | : Kirk Dow Sanders et al. | |

It is certified that error appears in the above-identified patent and that said Letters Patent is hereby corrected as shown below:

On the title page: item [75] the name of the second named inventor is listed as "Wing Cheong Chang." The second named inventor should be listed as --Wing Cheong Chau--.

On the title page item [57], the third sentence of the Abstract: delete "plurality unused fields" and insert --plurality of unused fields--.

In column 3, line 18: delete "field programmable gate area" and insert --field programmable gate array--.

In column 6, line 25: delete "configuration of TSI 225" and insert --configuration of TSI 226--.

In column 10, line 28: delete "block 660 does not corresponds" and insert --block 660 does not correspond--.

In column 10, line 58: delete "the plurality or unused fields" and insert --the plurality of unused fields--.

In column 11, line 12: delete "different from, the transferred test data" and insert --different from the transferred test data--.

In column 11, lines 22, 36, and 56, column 12, lines 4, 20, 33, and 55, and column 13, lines 4 and 21: delete "plurality unused fields" and insert --plurality of unused fields--.

In column 11, line 28: delete "components of tie" and insert --components of the--.

UNITED STATES PATENT AND TRADEMARK OFFICE
CERTIFICATE OF CORRECTION

PATENT NO. : 6,931,022 B1
APPLICATION NO. : 09/322708
DATED : August 16, 2005
INVENTOR(S) : Kirk Dow Sanders et al.

It is certified that error appears in the above-identified patent and that said Letters Patent is hereby corrected as shown below:

In column 11, line 32: delete "components or the transmission system" and insert --components of the transmission system--.

Signed and Sealed this

Fourteenth Day of November, 2006

JON W. DUDAS
*Director of the United States Patent and Trademark Office*